(12) United States Patent
Gray

(10) Patent No.: US 6,353,821 B1
(45) Date of Patent: Mar. 5, 2002

(54) METHOD AND DATA PROCESSING SYSTEM FOR DETECTING PATTERNS IN SQL TO ALLOW OPTIMIZED USE OF MULTI-COLUMN INDEXES

(75) Inventor: James E. Gray, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/472,362

(22) Filed: Dec. 23, 1999

(51) Int. Cl.[7] .................................................. G06F 17/30
(52) U.S. Cl. .................................................. 707/2; 707/3
(58) Field of Search ........................ 707/2, 1, 3, 4, 707/6, 10, 100–104.1

(56) References Cited

U.S. PATENT DOCUMENTS

| | | | | |
|---|---|---|---|---|
| 5,189,709 A | * | 2/1993 | Wang et al. ................. 382/215 |
| 5,812,840 A | * | 9/1998 | Shwartz .......................... 707/4 |
| 5,913,207 A | * | 6/1999 | Chaudhuri et al. .............. 707/2 |
| 5,918,225 A | * | 6/1999 | White et al. ..................... 707/2 |
| 5,924,088 A | * | 7/1999 | Jakobsson et al. .............. 707/2 |
| 5,930,785 A | * | 7/1999 | Lohman et al. ................. 707/2 |
| 5,950,186 A | * | 9/1999 | Chaudhuri et al. .............. 707/2 |
| 5,960,423 A | * | 9/1999 | Chaudhuri et al. .............. 707/2 |
| 5,995,957 A | * | 11/1999 | Beavin et al. ................... 707/2 |
| 6,052,687 A | * | 4/2000 | Miura et al. ................. 707/100 |
| 6,073,129 A | * | 6/2000 | Levine et al. ................... 707/4 |
| 6,105,018 A | * | 8/2000 | Demers et al. .................. 707/2 |

OTHER PUBLICATIONS

"An Introduction to Database Systems", vol. I, 4th Edition Author: C. J. Date, © 1986 Addison–Wesley Publishing Co., Inc.

"SQL instant Reference" Author: Martin Gruber, © 1993 Sybex, Inc.

"DB2 Design & Development guide", 3rd Edition Authors: Gabrielle Wiorkowski & David Kull, © 1992, 1990, 1988 Addison–Wesley Publishing Co., Inc., Sec. 9.3, PP 247–259.

\* cited by examiner

Primary Examiner—Thomas Black
Assistant Examiner—Uyen Le
(74) Attorney, Agent, or Firm—J. S. Solakian; J. H. Phillips (57) ABSTRACT

A database management optimizer detects patterns in SQL that occur when search conditions are present that represent ranges of values across multiple columns of a table. These patterns are recognized and translated into simpler key value ranges that can be used to provide more efficient use of database indexes.

18 Claims, 7 Drawing Sheets

METHOD AND DATA PROCESSING SYSTEM FOR DETECTING PATTERNS IN SQL TO ALLOW OPTIMIZED USE OF MULTI-COLUMN INDEXES

FIELD OF THE INVENTION

The present invention generally relates to database processing systems, and more specifically to optimizing SQL database queries to optimize processing of multi-column database indexes.

BACKGROUND OF THE INVENTION

Relational database optimizers have the task of converting the "what is desired" that a user expresses in the database interface language SQL into the "how to accomplish" specifics entailed in a database access plan.

In order to more efficiently access (especially relational) databases, indexes are typically utilized. A given database may have multiple indexes. Each index contains essentially a pair consisting of a key and a link to a database row or record. The pairs are then effectively organized in sorted key order. One well known method of implementing indexes is the use of B-Trees. A database row or record can then be rapidly accessed utilizing the row or record "key" to identify the corresponding row or record. In the case of a relational database, the index "keys" are typically the column values for one or more columns for each row or record in the database. In the case of a multiple column index, the index "key" can be viewed as the corresponding column values for each row concatenated together.

Indexes are also often utilized when processing database queries. A database optimizer is typically utilized to transform a SQL database query into an optimal set of database operations. One typical optimization is to utilize indexes to a database in order to minimize the necessity of reading entire database rows. That is because the requisite column values for the rows have already been extracted from the rows during index creation or update before the query is processed. Thus, it is often very efficient to eliminate all rows or records from a query that don't match search key values in an index or indexes before any actual rows are retrieved for processing. Thus, database optimizers often group query components that reference indexed columns together. The following disclosure is primarily concerned with this situation.

A typical SQL query against a database has the form shown in the following example:

SELECT FIRST_NAME, LAST_NAME, PHONE_NUMBER
FROM TELEPHONE_TABLE WHERE LAST_NAME=
"GRAY"

This query returns the names and phone numbers of people listed in the TELEPHONE TABLE that have a last name of "GRAY".

A good access plan for this simple example would be accessing the table via an index on the LAST_NAME column. An index search using the value "GRAY" is a fast method of returning the correct answers. Refer to "An Introduction to Database Systems" by C. J. Date for further background on relational databases and optimizers.

In current commercial relational database optimizers, there are deficiencies in producing the best access plan in all cases. In particular, when a multi-column index is defined, and a range of values is needed to satisfy the query, then the index may not be used in the most efficient manner.

This deficiency is the result of an "impedance mismatch" between the need for SQL to specify search conditions on column values and the methods needed to specify range conditions on multi-column indexes. This is because SQL by its design goals has to be independent of the current index definitions on the database tables (i.e. not making use of index names). For further information, refer to explanations of the ANSI SQL standard such as "SQL Instant Reference" by M. Gruber or "Understanding the New SQL: A Complete Guide" by J. Melton and A. Simon. This use of the term "impedance mismatch" is not to be confused with that of using SQL embedded in programming languages such as COBOL. When used in that context, the term refers to SQL's set oriented nature as opposed to the row at a time capability of the language/database interface and its use of cursors.

It would be advantageous to be able to efficiently translate SQL queries into a proper access plan when there is a set of conditions on the columns of a multi-column index that represent a range of values on that index. This would provide significantly faster processing of multi-column indexes by selecting only qualifying key values from the index where there is a set of conditions on the columns of a multi-column index that represent a range of values on that index.

For example, assume that a table DATE_TABLE has an index defined on the following three columns whose combined value represents a date:

YEAR, MONTH, DAY

Suppose the result of a query is to be those rows from the table that have dates in the following range:

March 15, 1994 to June 23, 1996

Assume that the table's MONTH values are encoded as 1 to 12 for January through December. The SQL required to express this range of index values can be given in positive (inclusive) form as follows:

```
1.  SELECT *
2.  FROM DATE_TABLE
3.  WHERE   ((YEAR = 1994 AND MONTH = 3 AND DAY >= 15)
4.          OR (YEAR = 1994 AND MONTH > 3)
5.          OR (YEAR > 1994))
6.          AND ((YEAR = 1996 AND MONTH = 6 AND DAY <= 23)
7.          OR (YEAR = 1996 AND MONTH < 6)
8.          OR (YEAR < 1996))
```

Figure 1:
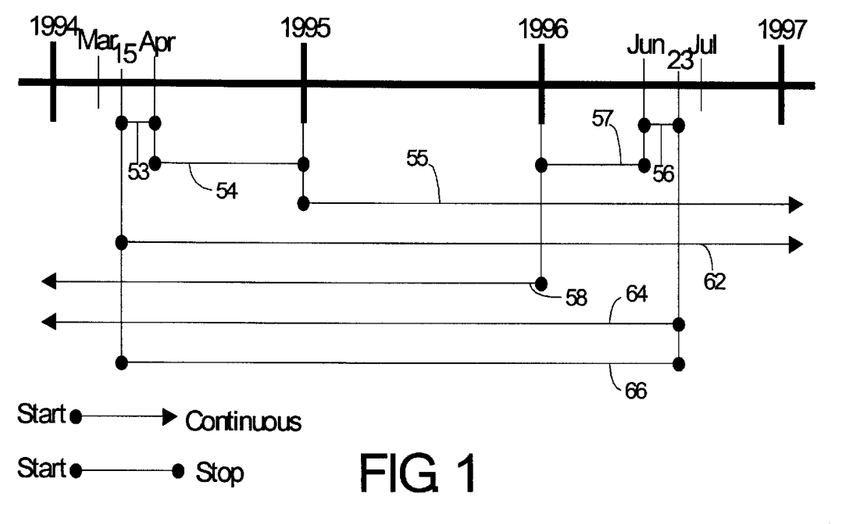
FIG. 1 is a diagram illustrating the logical operation of a SQL statement in positive (inclusive) form.

FIG. 1 is a diagram illustrating the logical operation of that SQL statement in positive (inclusive) form. The FIG. consists of single and double headed time line segments. The double-headed line segments represent time intervals bounded at both ends, whereas the single-headed line segments represent time intervals bounded at one end, but not the other. Table T-1 contains the correspondence between the above SQL and the reference numbers in the FIG. The final result or selection (March 15, 1994 to June 23, 1996) is shown as 66.

TABLE T-1

| Ref# | Operation |
|------|-----------|
| 53 | Line 3 (L3) |
| 54 | Line 4 (L4) |
| 55 | Line 5 (L5) |
| 56 | Line 6 (L6) |
| 57 | Line 7 (L7) |
| 58 | Line 8 (L8) |

TABLE T-1-continued

| Ref# | Operation |
|---|---|
| 62 | L3 \| L4 \| L5 |
| 64 | L6 \| L7 \| L8 |
| 66 | (L3 \| L4 \| L5) & (L6 \| L7 \| L8) |

This same multi-column index range condition can also be expressed in a negative (exclusive) form. This is often as recommended by vendors and/or database specialists (reference DB2 Design & Development Guide by G. Wiorkowski and D. Kull, section 9.3 Cursors and Repositioning, especially page 253).

The following is an example of the recommended negative form of the same conditions:

```
1.  SELECT*
2.  FROM DATE_TABLE
3.  WHERE    YEAR >= 1994
4.     AND NOT (YEAR = 1994 AND MONTH <3)
5.     AND NOT (YEAR = 1994 AND MONTH = 3 AND DAY < 15)
6.     AND       YEAR <= 1996
7.     AND NOT (YEAR = 1996 AND MONTH > 6)
8.     AND NOT (YEAR = 1996 AND MONTH = 6 AND DAY > 23)
```

Figure 2:
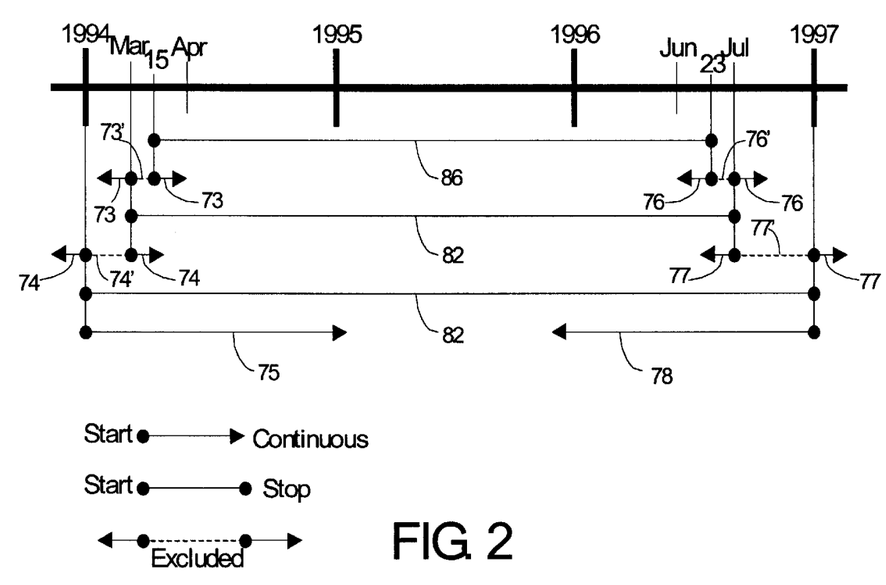
FIG. 2 is a diagram illustrating the logical operation of a SQL statement in negative (exclusive) form.

This is equivalent to specifying the total range of 1994 to 1996 and then removing the pieces that don't fit as specified by the remaining NOT conditions. FIG. 2 is a diagram that illustrates this negative (exclusive) form as marked by the line numbers from the example above on which the conditions occur. The correspondence between the reference numbers in the FIG. and the line numbers in the above negative form SQL is shown in Table T-2. The final result or selection (March 15, 1994 to June 23, 1996) is shown as 86.

TABLE T-2

| Ref# | Operation |
|---|---|
| 73 | Line 3 (L3) |
| 73' | Line 3 negated (L3') |
| 74 | Line 4 (L4) |
| 74' | Line 4 negated (L4') |
| 75 | Line 5 (L5) |
| 75' | Line 5 negated (L5') |
| 76 | Line 6 (L6) |
| 76' | Line 6 negated (L6') |
| 77 | Line 7 (L7) |
| 78 | Line 8 (L8) |
| 82 | L7 & L8 |
| 84 | 82 & (^L6') & (^L4') |
| 86 | 84 & (^L5') & (^L3') |

One problem with most current relational database systems is that when either form of the index range condition is supplied in the SQL, only the first column of the index is used in the access plan. For the negated form, this means that only the following conditions are used in accessing the index:

YEAR>=1994 AND YEAR<=1996

Problems with performance arise when the data in the table is distributed so that there are a large number of rows that satisfy this condition, but only a few rows satisfy the entire set of search conditions specified in the WHERE clause. In this case, the overall performance of the query is considerably reduced from what the best possible access plan could produce, which is to use all column conditions in the index search.

It would thus be advantageous to be able to efficiently translate SQL queries into a proper access plan when there is a set of conditions on the columns of a multi-column index that represent a range of values on that index. For example, when accessing a range of dates utilizing an index containing YEAR, MONTH, and DAY columns, it would be advantageous to be able to start and stop extraction of rows from the corresponding database based on the corresponding dates. This translation would provide significantly faster processing of multi-column indexes where there is a relationship between the multi-column conditions.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A database management optimizer disclosed hereinbelow detects patterns in SQL that occur when search conditions are present that represent ranges of values across multiple columns of a table. These patterns are recognized and translated into simpler key value ranges that can be used to provide more efficient use of database indexes.

There is a pattern present in these forms of query conditions that can be exploited in order to recognize when more complete use of the index is possible. The following will discuss the pattern arising from the conditions given in negative form. A similar pattern arises from the positive form and can be handled either in a similar manner or by translation between the two forms.

This pattern becomes more apparent when the negative form of the query is rewritten without the NOT conditions by applying Demorgan's Theorem. The result is the following:

```
1.  SELECT*
2.  FROM DATE_TABLE
3.  WHERE    YEAR >= 1994
4.     AND (YEAR ^= 1994 OR MONTH >= 3)
5.     AND (YEAR ^= 1994 OR MONTH ^= 3 OR DAY >= 15)
6.     AND YEAR <= 1996
```

-continued

7. AND (YEAR ^= 1996 OR MONTH <= 6)
8. AND (YEAR ^= 1996 OR MONTH ^= 6 OR DAY <= 23)

This form of the WHERE clause contains GROUPS that consist of individual column conditions connected by OR operators. These OR-GROUPs are then connected by AND operators. Conditions expressed in this form are in Conjunctive Normal Form (CNF).

In the general case, producing CNF is the result of applying the distributive law to the ANDed/ORed conditions of the WHERE clause. The AND's and OR's can be viewed as the NODES of a binary tree, with the individual column conditions as the LEAVES. In this form, CNF produces a tree in which all AND nodes are above all OR nodes in the tree. This means that there are ORed conditions grouped together, and each of the OR-GROUPS is connected by ANDs.

In the current example, this results in the following two dimensional matrix, or pattern of OR-GROUPS, versus columns of the index shown below in Table T-3. The OR-GROUPS are all considered as ANDed together. The intersection of a vertical column and a horizontal row holds the comparison operator and constant used in the condition from that OR-GROUP, numbered from 1 to 6 on the left, and the particular column of the index whose name is given on the top. The "- - -" marks at such an intersection indicate that no condition occurs on that index column within this OR-GROUP.

TABLE T-3

|  | Op | YEAR | Op | MONTH | Op | DAY |
|---|---|---|---|---|---|---|
| OR-GROUP #1 | >= | 1994 | — | — | — | — |
| OR-GROUP #2 | ^= | 1994 | >= | 3 | — | — |
| OR-GROUP #3 | ^= | 1994 | ^= | 3 | >= | 15 |
| OR-GROUP #4 | <= | 1996 | — | — | — | — |
| OR-GROUP #5 | ^= | 1996 | <= | 6 | — | — |
| OR-GROUP #6 | ^= | 1996 | ^= | 6 | <= | 23 |

This is considered to be two index range conditions ANDed together, the LEFT side and the RIGHT side of a BETWEEN condition. It is also possible to have just a 1-sided range condition such as the following in Table T-4:

TABLE T-4

|  | Op | YEAR | Op | MONTH | Op | DAY |
|---|---|---|---|---|---|---|
| OR-GROUP #1 | >= | 1994 | — | — | — | — |
| OR-GROUP #2 | ^= | 1994 | >= | 3 | — | — |
| OR-GROUP #3 | ^= | 1994 | ^= | 3 | >= | 15 |

This qualifies all key values above a certain value without a bounding condition.

Consider the rows, columns, and shape of the previous 1-sided range condition and its pattern of conditions shown below in Table T-5:

TABLE T-5

|  | Op | 1 | Op | 2 | Op | 3 |
|---|---|---|---|---|---|---|
| Row #1 | >= | 1994 | — | — | — | — |
| Row #2 | ^= | 1994 | >= | 3 | — | — |
| Row #3 | ^= | 1994 | ^= | 3 | >= | 15 |

The conditions themselves form the lower triangular portion of a matrix as shown by the X's below in Table T-6:

TABLE T-6

|  | Columns | | |
|---|---|---|---|
| Rows: | 1 | 2 | 3 |
| 1 | X | 0 | 0 |
| 2 | X | X | 0 |
| 3 | X | X | X |

If this is considered a matrix X(I,J), then the items where I=J are on the diagonal of the matrix as shown by the shaded items in Table T-7 below:

TABLE T-7

|  | Columns | | |
|---|---|---|---|
| Rows | 1 | 2 | 3 |
| 1 | X | 0 | 0 |
| 2 | X | X | 0 |
| 3 | X | X | X |

Items below the diagonal are all conditions which use the "^=" comparison and are shaded below in Table T-8:

TABLE T-8

|  | Columns | | |
|---|---|---|---|
| Rows | 1 | 2 | 3 |
| 1 | X | 0 | 0 |
| 2 | X | X | 0 |
| 3 | X | X | X |

Items above the diagonal are an area where no conditions occur and are circled below in Table T-9:

TABLE T-9

|  | Columns | | |
|---|---|---|---|
| Rows | 1 | 2 | 3 |
| 1 | X | 0 | 0 |
| 2 | X | X | 0 |
| 3 | X | X | X |

The most general pattern contains two 1-sided range conditions which are the left and right sides of a BETWEEN or 2-sided range condition. Each 1-sided pattern has the following characteristics for each sub-matrix (i.e. the matrix limited to the conditions of that side):

1. There are no comparison conditions above the diagonal. In matrix terms, this means no conditions occur in a column above the diagonal or in a row to the right of the diagonal. This indicates that all conditions occur in the lower triangular sub-matrix.
2. All constant values in the same matrix column are the same.
3. The comparisons on the diagonal for all but the last key column must be the same (i.e. all ">=" for a left side, or all "<=" for a right sided).
4. The first key column comparison on the diagonal must be ">=" ("<=") for the left side (right side) unless it's the only key column used.
5. If the first key column is the only key column used then a ">" ("<") comparison is also allowed for the left side (right side).

6. In a given matrix column, all comparisons below the diagonal (i.e. after the first for that key column), are always the "^=" compare operator.
7. The right most key column comparison on the diagonal is called the trailing or last condition. It has the compare operator that is needed for the index range comparison: ">" or ">=" ("<" or "<=") for the left side (right side).
8. The number of key column comparisons increases by one over the previous row of the matrix (i.e. previous OR-GROUP).

In addition, 2-sided conditions have the characteristics that:

9. The left and right sides sub-matrix do not have to match in terms of rows or columns (i.e. they may have different number of key columns used and different number of OR-GROUPs).
10. The start of the right side is detectable by the fact that item 8 above is violated (i.e. the number of key column conditions does not increase from the previous OR-GROUP of the left side).

Using this pattern, the comparison operators and constant values required for searching the index can be extracted from the diagonal of each 1-sided range condition. In the example above, the diagonal for the left side of the BETWEEN condition occurs at the following intersections:

OR-GROUP #1 and YEAR column

OR-GROUP #2 and MONTH column

OR-GROUP #3 and DAY column

This means that the composite key value will be a concatenation of the values:

1994

3

15

The comparison operator to be used for this left side of the BETWEEN is taken from the trailing condition of OR-GROUP #3 and will be:

>=

Similarly, the right side of the BETWEEN condition occurs at the following intersections:

OR-GROUP #4 and YEAR column

OR-GROUP #5 and MONTH column

OR-GROUP #6 and DAY column

The composite key values for the right side or the BETWEEN will be a concatenation of the values:

1996

6

23

The comparison operator for the right side of the BETWEEN will be:

<=

The resulting final condition to be used in searching the index can be expressed using the following notational convention. Use KEY_VALUE as if it were an SQL element representing the index that could be compared against like a column name. Specify the index search value as concatenated constants as if it were a character string (decimal values are converted to strings with a leading sign before concatenation). This results in the following index search conditions:

KEY_VALUE>="+1994+03+15" AND KEY_VALUE<="+1996+06+23"

The PATTERN does not have to start with the first column of the index when there are "=" conditions against the leading columns of the index such as in the following WHERE clause:

1. SELECT*
2. FROM DATE_TABLE
3. WHERE YEAR = 1994
4.   AND       MONTH >= 3
5.   AND       (MONTH ^= 3 OR DAY >= 15)

In this case, the conditions are divided into the two sets, namely the LEADING EQUAL CONDITIONS and the CORE PATTERN conditions as shown below in Table T-10:

TABLE T-10

|  | YEAR | MONTH | DAY | Notes |
| --- | --- | --- | --- | --- |
| OR-GROUP #1 | 1994 | — | — | Leading "=" |
| OR-GROUP #2 | — | >=3 | — | Condition |
| OR-GROUP #3 | — | ^=3 | >=15 |  |

Here the CORE PATTERN occupies the sub-matrix consisting of columns MONTH and DAY, and the OR-GROUPs numbered 2 and 3. The leading equal condition is in OR-GROUP number 1 on column YEAR.

The example above represents a 1-sided range condition with leading equal conditions. In this case, the equivalent search condition on the index will always be a 2-sided range or BETWEEN condition. This is because a BOUNDING CONDITION must be added to guarantee that the index values satisfy the "=" condition. Thus the above example would result in the following index range search, using the previous notational conventions:

KEY_VALUE>="+1994+03+15" AND KEY_VALUE<="+1994+99"

The BOUNDING CONDITION search value uses the leading equal condition constant values plus a domain maximum value, in this case 99 for a DEC(2) column. If the original 1-sided range were for a "<" or "<=" comparison, then a minimum domain value would have been used instead to build the other side of the BETWEEN.

When trying to detect the PATTERN, certain OR-GROUPs can represent conditions that are not usable for index access or have no chance of fitting the PATTERN. These include OR-GROUPs with:

1. No conditions against the leading columns of the index;
2. Conditions that are not on adjacent columns of the index; and
3. Added conditions against a column already having a leading equal condition (a good leading equal OR-GROUP has a single '=' condition).

When such an OR-GROUP is found it is logically discarded (actually retained, but marked as "ignore"). When a PATTERN index access is used, these ignored added restriction OR-GROUPs are used as additional qualifying conditions on the data rows that the index search specifies. This results in the correct answer to the query.

The following Table T-11 is an example of a matrix containing some OR-GROUPs that are ignored for various reasons using an arbitrary index definition on columns named C1, C2, C3 and C4:

TABLE T-11

| OR Group | Key Columns | | | | Comments |
|---|---|---|---|---|---|
| | C1 | C2 | C3 | C4 | |
| 1 | <Non-Indexed Columns> | | | | "Ignored", non-key conditions |
| 2 | C1 = 1 | | | | "Good", leading "=" |
| 3 | C1 >= 1 | | | | "Ignored", redundant leading |
| 4 | | C2 >= 2 | | | "Good", core pattern, left |
| 5 | | C2 ^= 2 | C3 >= 3 | | "Good", core pattern, left |
| 6 | | C2 ^= 2 | | C4 = 4 | "Ignored", non-adjacent |
| 7 | | C2 ^= 2 | C3 ^= 3 | C4 >= 4 | "Good", core pattern, left |
| 8 | | | | C4 ^= 6 | "Ignored", no leading condition |
| 9 | | C2 <= 3 | | | "Good", core pattern, right |

Added restrictions can also occur on key columns, but after a CORE PATTERN, resulting in partial use of columns of the index for the index search. This is a PARTIAL PATTERN in which only some of the leading columns of the index are used. When this type of key column added restriction is present with a partial pattern, It cannot be used to further enhance the index range condition search. The following example in Table T-12 shows this type of added restriction on column C4:

TABLE T-12

| OR Group | Key Columns | | | | Comments |
|---|---|---|---|---|---|
| | C1 | C2 | C3 | C4 | |
| 1 | C1 = 1 | | | | Leading "=" |
| 2 | | C2 >= 2 | | | |
| 3 | | C2 ^= 2 | C3 >= 3 | | |
| 4 | | | | C4 >= 4 | Added Restriction |

The PARTIAL PATTERN occurs in OR-GROUPs number 2 and 3 on columns named C2 and C3. The key column added restriction is in OR-GROUP number 4. Thus the above example would result in the following index range search, using the previous notational conventions:

KEY_VALUE>="+01+02+03" AND KEY_VALUE<="+01+99"

The second constant will result in all key values starting with "+01" being returned from the index search. This is because searching the index for a value like "+01+99" is equivalent to taking a SUBSTR of the leading portion of the key value before doing the compare.

The added restriction of C4=4 would be applied to the rows satisfying the index search in order to produce the correct answer to the query.

Even though the matrix used to hold the pattern is conceptually a two dimensional array X(I,J), it is implemented with only the KEY COLUMNs portion (the J or vertical column dimension) as a true array. The OR-GROUPs (the I or horizontal row dimension) is actually implemented as a doubly linked list of OR-GROUPS. Each OR-GROUP has a pointer to its KEY COLUMN array.

The reason for this approach is that the OR-GROUPs have to be sorted, and a linked list provides for less data movement during sorting and thus a more efficient sort (only pointers need to be switched).

The KEY COLUMNs array elements hold information about the comparison of a column of the index, as identified by its array position, for a particular OR-GROUP. This information includes the compare operator and the constant compared against. There is also summary information such as where the first and last comparisons occur within the array.

The OR-GROUP list element also holds summary information about the conditions represented by its individual KEY COLUMNs array. This includes whether key and/or non-key column conditions are present, whether this OR-GROUP represents a leading equals condition, or an added restriction, etc.

In addition to the KEY COLUMNs array and the OR-GROUPs linked list, there is a header structure that provides the following kinds of information that classify the OR-GROUPs:
1. Start and end of leading equal conditions;
2. Start and end of left side core pattern; and
3. Start and end of right side core pattern.

Also present is summary information such as whether the comparisons used for the left and right side of a BETWEEN are compatible, the total pattern size (i.e. number of key columns used), whether a leading equal boundary condition needs to be added, etc.

Figure 3:
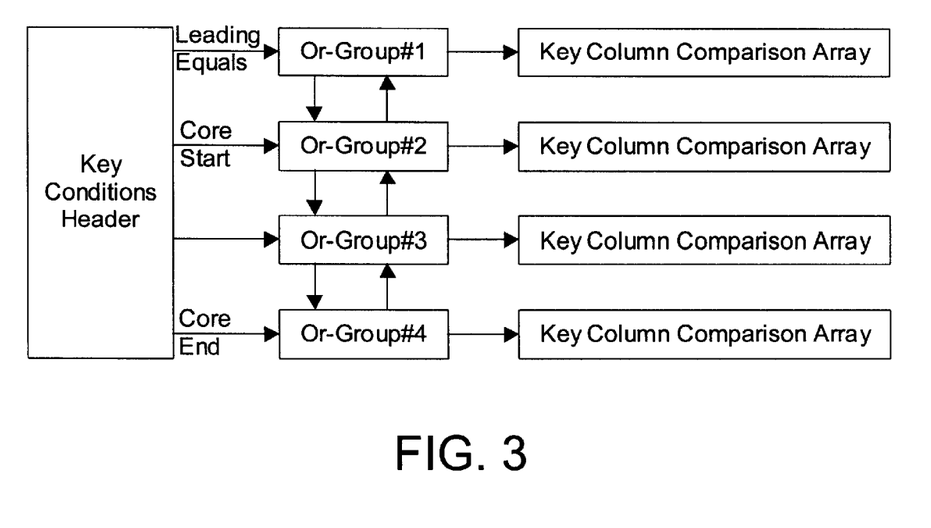
FIG. 3 is a block diagram illustrating data structures utilized in a preferred embodiment of the operation of the present invention.

FIG. 3 is a block diagram illustrating data structures utilized in a preferred embodiment of the operation of the present invention.

The pattern detection algorithm given below has the following tasks:
1. Make sure that the pattern is in a canonical form, regardless of the form given by the user;
2. Handle the case of "leading equal" conditions and build boundary conditions when needed;
3. Handle the case of "added restrictions" that do not contribute to the pattern;
4. Handle both 1 and 2-sided range conditions, detecting their core patterns;
5. Extract the proper constants to build a key value(s) for searching the multi-column index;
6. Extract the proper comparison operators for the 1 or 2-sided range comparison specified;
7. Make sure that the index range condition pattern represents the best access method; and
8. Reduce use of pattern detection when too much optimizer time would be used (e.g. large joins).

Figure 4:
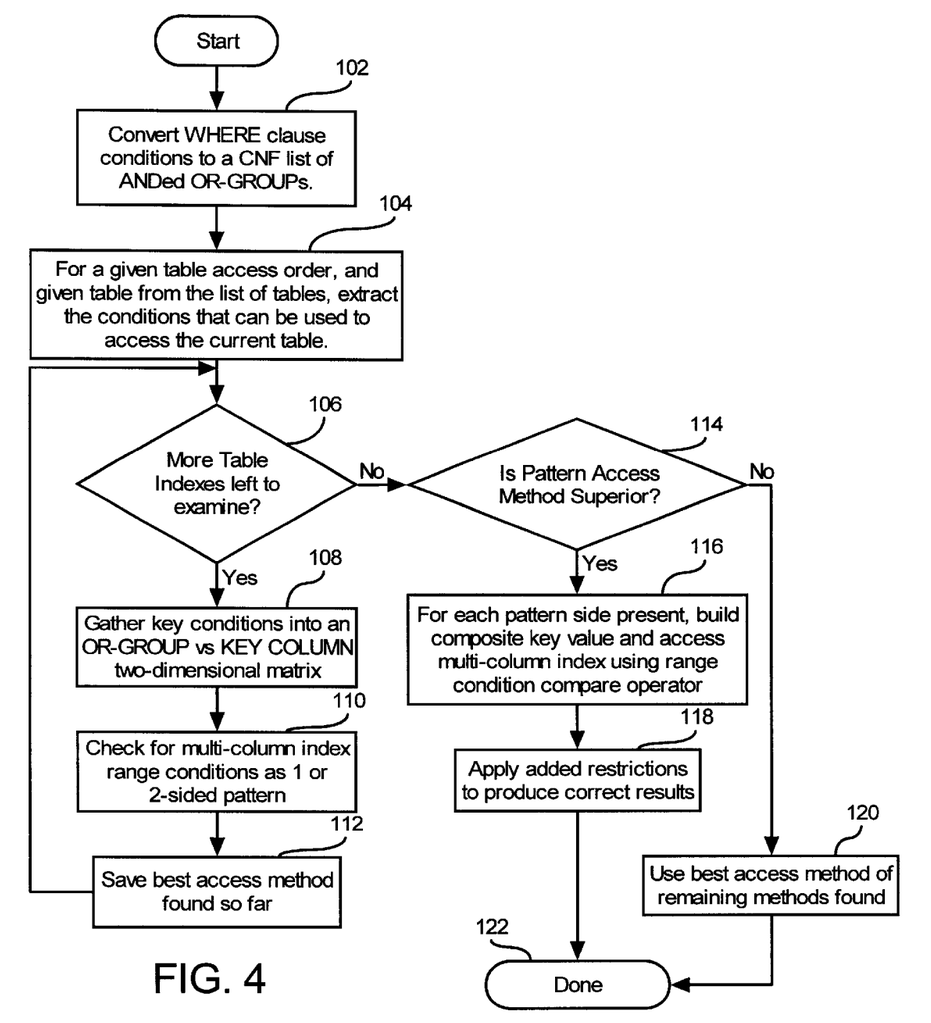
FIG. 4 is a flowchart illustrating operation of a preferred embodiment of the present invention.

FIG. 4 is a flowchart illustrating operation of a preferred embodiment of the present invention. It starts by converting WHERE clauses conditions to a CNF list of ANDed OR-GROUPs, step 102. Then, for a given table access order, and given table from the list of tables, the conditions that can be used to access the current table are extracted, step 104. Next a loop is entered. A test is made whether there are any more Table Indexes left to examine, step 106. If any Table indexes remain to be examined, step 106, key conditions are gathered into an OR-GROUP vs. KEY COLUMN two-dimensional matrix, step 108. Then, a check is made for multi-column index range conditions as 1 or 2-sided patterns, step 110. Next, if this is the best access method found so far, it is saved as such, step 112. Then, the loop repeats, starting with the test for more Table indexes to examine, step 106.

When no more Table indexes remain to be examined, step 106, a test is made whether this pattern access method is superior, step 114. If this is a superior pattern access method, step 114, a composite key value is built and a multi-column index is accessed using range condition compare operator for each pattern side present, step 116. Then added restrictions are applied to the retrieved rows to produce the correct results, step 118. Alternatively, when this access method is not determined to be superior, step 114, the best access method of the remaining methods found is utilized, step 120. In all cases, the method then is complete, step 122.

Figure 5:
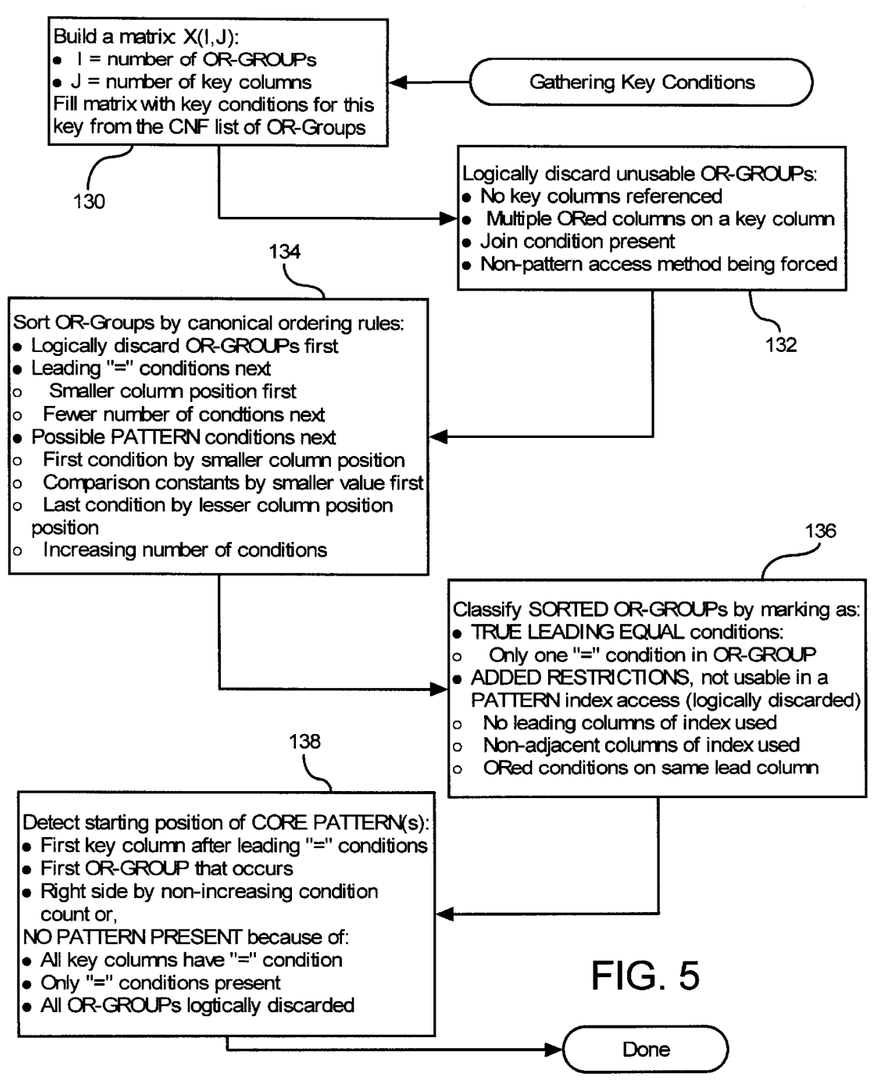
FIG. 5 is a flowchart illustrating operation of Gathering Key Conditions module in FIG. 3.

FIG. 5 is a flowchart illustrating operation of Gathering Key Conditions step 108 in FIG. 4. It starts by building a matrix: X(I, J), where "I" is the number of OR-GROUPs, and "J" is the number of key columns. The matrix is then filled with key conditions for each key from the CNF list of OR-GROUPs, step 130. Then, unusable OR-GROUPs are discarded, step 132. These unusable OR-GROUPs include OR-GROUPs where:

No key column is referenced;

It contains key and non-key conditions;

It contains multiple ORed conditions on a key column;

There are join conditions present; and

A non-pattern access method is being forced.

Then, OR-GROUPs are sorted by canonical ordering rules, step 134:

Logically discarded OR-GROUPs are first;

Leading "=" conditions follow next, such that:
  Smaller column position first; and
  Fewer number of conditions next; and Possible PATTERN conditions are next such that:
  First condition by smaller column position;
  Comparison constants by smaller value first;
  Left side before right side;
  Last condition by lesser column position; and
  Increasing number of conditions.

This is followed by classifying the SORTED OR-GROUPs, step 136, by marking them as:

True LEADING EQUAL conditions, where:
  Only one "=" condition is present in the OR_GROUP; and ADDED RESTRICTIONS, not usable in a PATTERN index access (to be logically discarded). These include:
  No leading columns of index used;
  Non-adjacent columns of index used; and
  ORed conditions on the same lead column.

Finally, the starting position of CORE PATTERN(s) is detected, step 138:

First key column after a leading "=" condition;

First OR-GROUP where that occurs; or

The start of a right sided pattern is detected by non-increasing condition count;

The following are reasons for not detecting a pattern ("NO PATTERN PRESENT"):

All key columns have "=" conditions;

Only "=" conditions present; or

All OR-GROUPs have been logically discarded.

Figure 6:
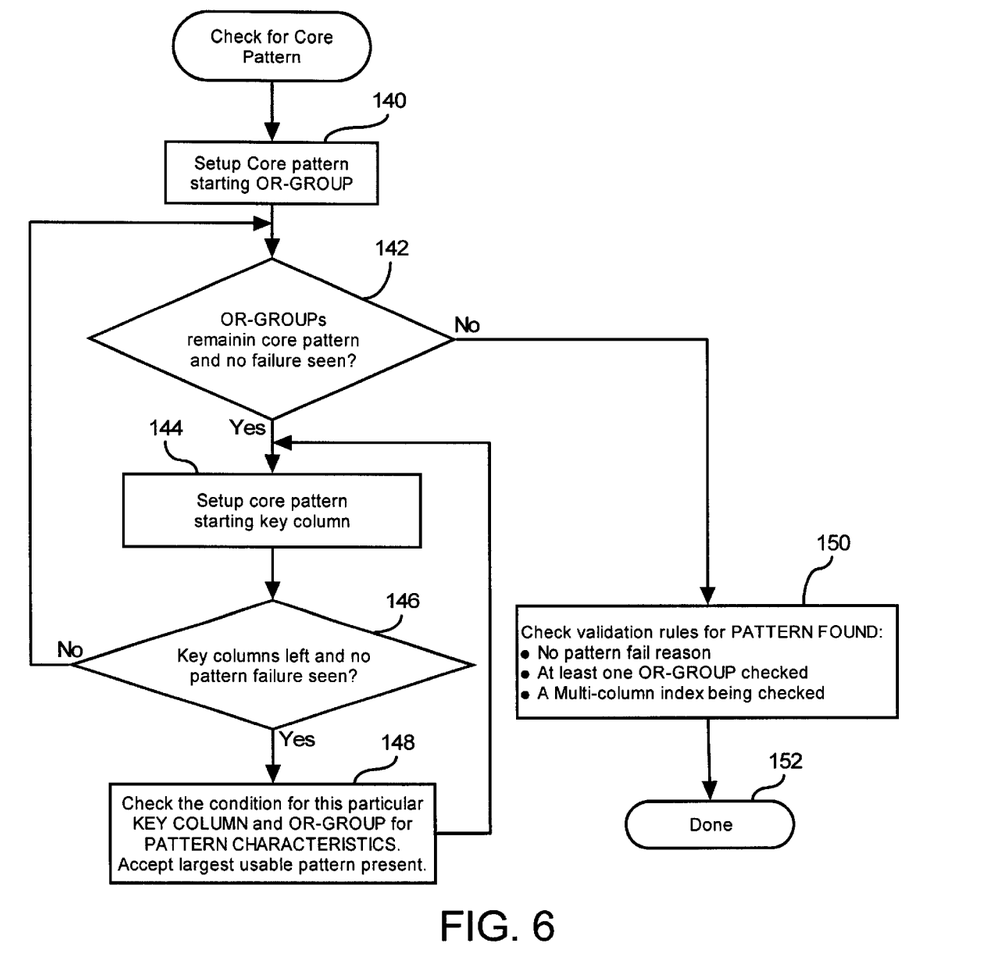
FIG. 6 is a flowchart illustrating operation of Check for Core Pattern module in FIG. 3.

FIG. 6 is a flowchart illustrating operation of Check for Core Pattern step 110 in FIG. 4. First, a core pattern starting OR-GROUP is setup, step 140. Then an outer loop is entered. A test is made whether any OR-GROUPs remain in the core pattern and that no pattern failure has been seen, step 142. If this is true, an inner loop is entered. Within that inner loop, the starting key column for the core pattern is setup, step 144. Then a test is made whether there are key columns left and no failure has been seen, step 146. If this is false, then the outer loop is repeated, starting at the test whether any OR-GROUPs remain in the core pattern, step 142. Otherwise, if key columns are left and no pattern failure has been seen, step 146, the condition for this particular KEY COLUMN and OR-GROUP is checked for PATTERN CHARACTERISTICS. The largest usable pattern present is accepted, step 148. Then the inner loop repeats, starting with the setup for core pattern starting key column, step 146.

The outer loop exits when either no more OR-GROUPs remain in the core pattern, or a pattern failure has been seen, step 142. At this point, upon exiting the outer loop, validation rules for PATTERN FOUND condition are checked, step 150. These rules must be satisfied for a valid pattern:

No pattern fail reason was encountered;

At least one OR-GROUP was checked;

All remaining key columns have been checked, and

A multi-column index was being checked.

After this check, step 150, the Check for Core Pattern step 110 is complete, step 152.

Figure 7:
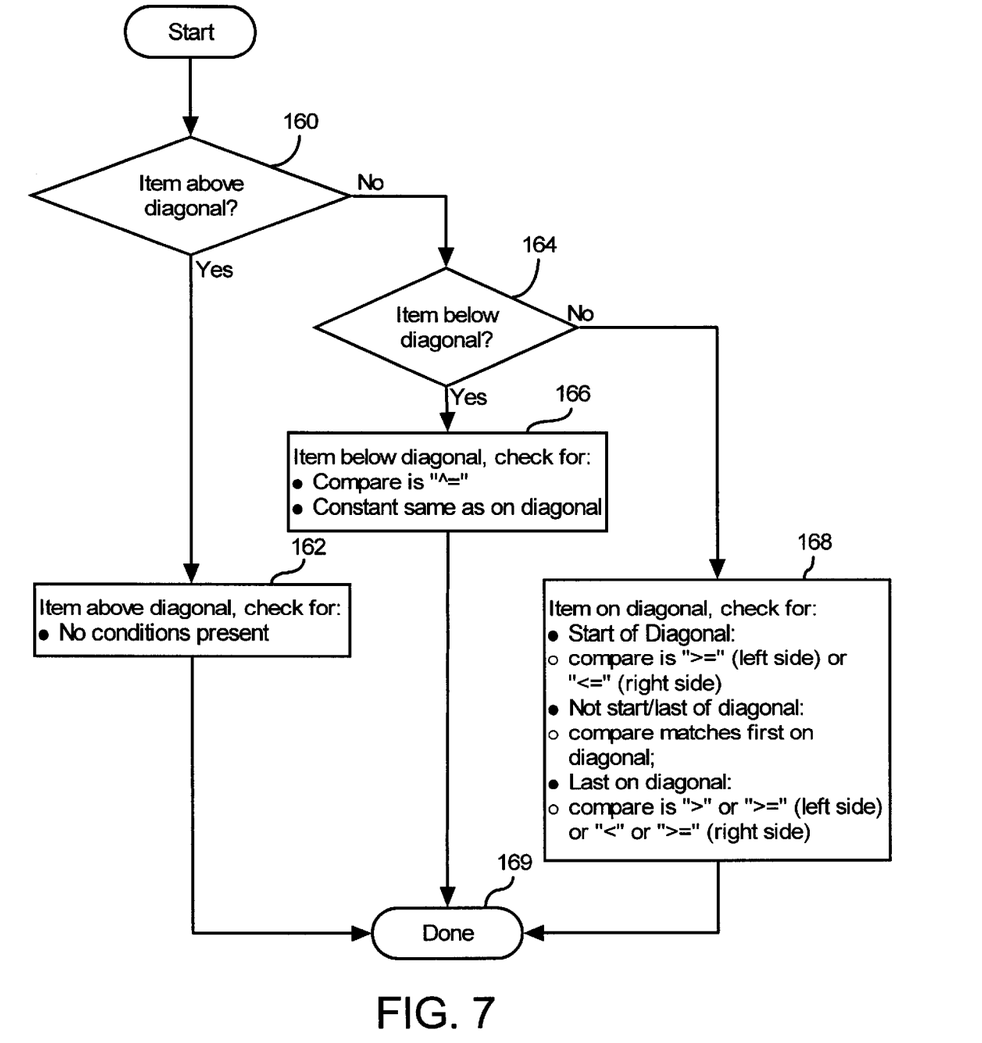
FIG. 7 is a flowchart illustrating operation of Check Pattern Characteristics module in FIG. 6.

FIG. 7 is a flowchart illustrating operation of Check Pattern Characteristics step 148 in FIG. 6. It starts by first testing whether the item is above the "diagonal", step 160. If the item is above the diagonal, step 160, a check is made for No Conditions Present, step 162, and the step 148 is complete, step 169. When this exit is taken, an invalid pattern was found because there were conditions above the diagonal. Otherwise, if the item is not above the diagonal, step 160, a test is made whether the item is below the "diagonal", step 164. If the item is below the diagonal, step 164, a check is made for whether the comparison operator is a "^=" and whether the constant in the condition is the same as that on the diagonal, step 166. If the exit to step 169 is taken here, an invalid pattern was found because either the comparison was not "^=" or the constant did not match the one in the same column on the diagonal. Otherwise, the item is on the diagonal, step 168, and checks are made for:

At the start of the diagonal, compare for ">=" (left side) or "<=" (right side);

Not at the start or end of the diagonal, compare matches first on the diagonal; and At the end (or last) of the diagonal, compare for ">" or ">=" (left side) or "<" or "<=" (right side).

In all cases, the Check Pattern Characteristics, step 148, is now complete, step 169.

Steps 162, 164, and 168 are tests that must be satisfied for an item that occupies that given position. The loops at higher levels walk through the entire matrix, thus visiting all matrix positions. All tests must pass for a valid pattern to be detected, otherwise it is an invalid pattern. The logic is set up to allow detection of the maximum size pattern possible (via order of looping).

Figure 8:
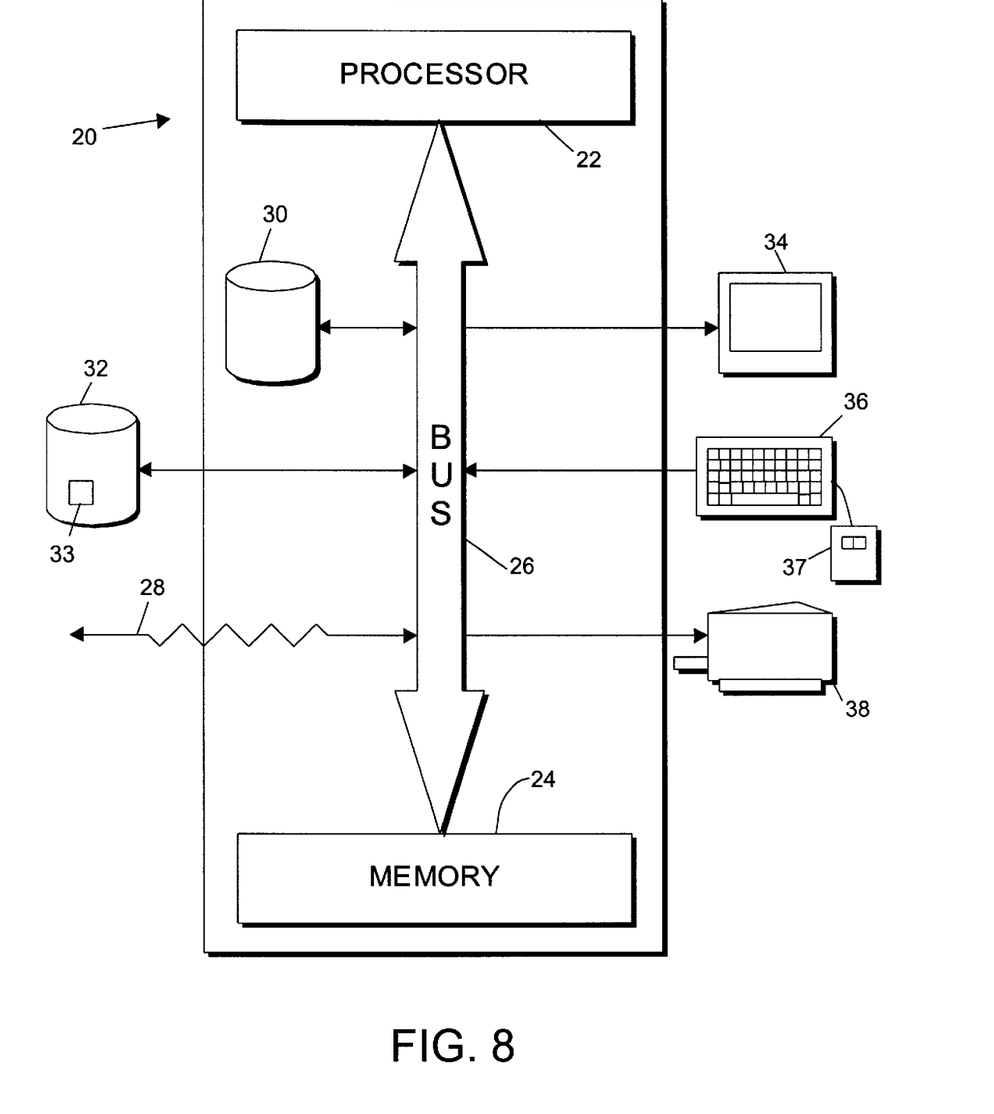
FIG. 8 is a block diagram illustrating a Data Processing System including a General Purpose Computer in accordance with the present invention.

FIG. 8 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Data structures such as those shown in FIG. 3 are typically stored in Volatile memory.

Also connected to the Bus are Secondary Storage 30, External Storage 32, output devices such as a monitor 34, input devices such as a keyboard 36 with a mouse 37, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such database management software, oper- Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

---

Attachment 1
PSEUDOCODE

```
Convert WHERE clause conditions to a CNF list of ANDed OR-GROUPs;
For a given table access order, extract the conditions which can be used to
access the current table;
For each index defined on this table
    {Gather key conditions into a two-dimensional matrix;
        Build TWO-DIMENSIONAL MATRIX of OR-GROUPs versus index
        columns;
            Discard unusable OR-GROUPs
            (no key columns referenced, combined key/non-key
            conditions, multiple OR-ed conditions on a column, join
            conditions present);
        Put two-dimensional matrix into canonical form by SORTING OR-
        GROUPs (ordering rules are discarded OR-GROUPS first, leading
        equal conditions next;
            OR-GROUPs in pattern ordered by number of conditions, left
            before right side of BETWEEN, added restrictions not part of
            pattern);
        Classify SORTED OR-GROUPs
            (mark OR-GROUPs as "leading equal" conditions, or as non-
            pattern "added restrictions" when no leading index column
            conditions, non-adjacent columns of index used, or multiple
            conditions on a leading equal condition column);
    Check for pattern if valid conditions remain;
        Check for "core pattern" on left side of a BETWEEN
        (determine if the pattern characteristics are satisfied);
        If right side present;
            {Check for "core pattern" on right side of a BETWEEN
            (determine if the pattern characteristics are satisfied);
            If pattern found
                Check for compatible BETWEEN comparisons};
        Handle errors by determining which sides are valid, left only, right
        only, or both (discard OR-GROUPs that belong to an unusable
        side, will be used as added restrictions);
        If 1-sided range pattern found with leading equal conditions
            {Build leading equals boundary condition, use min/max
            trailing column value (converts 1-sided range into a
            BETWEEN)};
    Save best access method in two categories so far best pattern and best
    other access method);
Determine superior access method;
If pattern access method superior
    {For each side of a BETWEEN that is present
        Build composite key value and comparison operator;
    Access multi-column index with range conditions from the PATTERN, Use
    logically discarded conditions as ADDED RESTRICTIONS (to qualify the
    returned data rows)}}.
```

--- ating systems, and user programs can be stored in a Computer Software Storage Medium, such as memory 24, Secondary Storage 30, and External Storage 32. Executable versions of computer software 33, such as database management software can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution. Databases are typically stored in Non-Volatile Memory, with portions of such, including Index files, residing in Volatile Memory during database management system operation.

What is claimed is:

1. A method of optimizing processing of a database query of a database in a data processing system, wherein: said method comprises:

A) detecting a first pattern in a set of SQL statements that occurs when a plurality of search conditions are present that represent a first set of values that provide a first multiple column range limit across multiple columns of a database table by:

1) converting a subset of the set of SQL statements into a CNF list of ANDed OR-GROUPs;

2) extracting a set of conditions that can be used to access a current table for a given table access order and a given table for a list of tables;

3) gathering key conditions into an OR-GROUP vs KEY COLUMN two-dimensional array;
4) checking for a multi-column index range condition; and
5) generating a first access method from the multi-column range condition; and
B) translating the first pattern into a first set of concatenated keys that represents the first multiple column range limit, wherein:
the first set of concatenated keys can be utilized to limit a search of the database.

2. The method in claim 1 which further comprises:
C) detecting a second pattern in SQL that occurs when a second plurality of search conditions are present that represent a second set of values that provide a second multiple column range limit across multiple columns of the database table; and
D) translating the second pattern into a second set of concatenated keys that represents the second multiple column range limit, wherein:
the second set of concatenated keys can be utilized to limit the search of the database.

3. The method in claim 2 wherein:
the first multiple column range limit is a lower limit on the search of the database; and
the second multiple column range limit is an upper limit on the search of the database.

4. The method in claim 1 wherein:
the first multiple column range limit is a lower limit on the search of the database.

5. The method in claim 1 wherein:
the first multiple column range limit is an upper limit on the search of the database.

6. The method in claim 1 which further comprises:
translating the set of SQL statements into an alternative form through use of DeMorgan's Theorum before step (A).

7. An optimizer for a database management software system for execution on a data processing system, wherein:
the optimizer for the database management software system provides improved processing of a database query of a database stored on a non-volatile medium in the data processing system; and
said optimizer comprises:
A) a set of computer instructions stored in a Computer Software Storage Medium for detecting a first pattern in a set of SQL statements that occurs when a plurality of search conditions are present that represent a first set of values that provide a first multiple column range limit across multiple columns of a database table by:
1) converting a subset of the set of SQL statements into a CNF list of ANDed OR-GROUPs;
2) extracting a set of conditions that can be used to access a current table for a given table access order and a given table for a list of tables;
3) gathering key conditions into an OR-GROUP vs KEY COLUMN two-dimensional array;
4) checking for a multi-column index range condition; and
5) generating a first access method from the multi-column range condition; and
B) a set of computer instructions stored in the Computer Software Storage Medium for translating the first pattern into a first set of concatenated keys that represents the first multiple column range limit, wherein:
the first set of concatenated keys can be utilized to limit a search of the database.

8. A computer readable Non-Volatile Storage Medium encoded with a set of computer instructions for an optimizer for a database management software system for execution on a data processing system, wherein:
the optimizer for the database management software system provides improved processing of a database query of a database stored on a non-volatile medium in the data processing system; and
said optimizer comprises:
A) a set of computer instructions for detecting a first pattern in a set of SQL statements that occurs when a plurality of search conditions are present that represent a first set of values that provide a first multiple column range limit across multiple columns of a database table by:
1) converting a subset of the set of SQL statements into a CNF list of ANDed OR-GROUPs;
2) extracting a set of conditions that can be used to access a current table for a given table access order and a given table for a list of tables;
3) gathering key conditions into an OR-GROUP vs KEY COLUMN two-dimensional array;
4) checking for a multi-column index range condition; and
5) generating a first access method from the multi-column range condition; and
B) a set of computer instructions for translating the first pattern into a first set of concatenated keys that represents the first multiple column range limit, wherein:
the first set of concatenated keys can be utilized to limit a search of the database.

9. The method in claim 1 wherein substep (4) of step (A) comprises:
testing whether a subset of the two-dimensional array that comprises a working array includes rows that form a diagonal;
testing whether a first element in the working array is above the diagonal; and rejecting the working array as a valid multi-column range if the first element is above the diagonal.

10. The method in claim 9 wherein substep (4) of step (A) further comprises:
testing whether the first element is below the diagonal; and
rejecting the working array as the valid multi-column range if the first element contains a constant that is not in a second element on the diagonal.

11. The method in claim 10 wherein substep (4) of step (A) further comprises:
testing whether at a start, at a middle, or at an end of the diagonal if the first element is not above the diagonal and is not below the diagonal;
rejecting the working array as the valid multi-column range if the first element is at the start of the diagonal and its operator is not a range operator;
rejecting the working array as the valid multi-column range if the first element is at the middle of the diagonal and its operator does match an operator of the first element on the diagonal; and
rejecting the working array as the valid multi-column range if the last element is at the end of the diagonal and its operator is not a range operator.

12. The method in claim 1 wherein step (A) further comprises:
  6) comparing the first access method against a best access method found; and
  7) setting the best access method found to the first access method if the first access method is better than the best access method found.

13. The method in claim 12 wherein step (A) further comprises:
  8) testing whether there are any more indexes left to examine;
  9) repeating substeps (3), (4), (5), (6), and (7) as a loop when there are more indexes left to examine.

14. The method in claim 13 wherein step (A) further comprises:
  10) testing whether the best access method found is superior; and
  11) building a composite key value and accessing a multi-column index using a range condition compare operator if the best access method found is superior.

15. The method in claim 1 which further comprises:
  C) utilizing the first set of concatenated keys to access a multi-column index to retrieve a first record from the database.

16. A data processing system containing a database management software system, wherein:
  the database management software system provides improved processing of a database query of a database stored on a non-volatile medium in the data processing system; and
  said database management software system comprises:
    A) a set of computer instructions stored in a Computer Software Storage Medium for detecting a first pattern in a set of SQL statements that occurs when a plurality of search conditions are present that represent a first set of values that provide a first multiple column range limit across multiple columns of a database table by:
      1) converting a subset of the set of SQL statements into a CNF list of ANDed OR-GROUPs;
      2) extracting a set of conditions that can be used to access a current table for a given table access order and a given table for a list of tables;
      3) gathering key conditions into an OR-GROUP vs KEY COLUMN two-dimensional array;
      4) checking for a multi-column index range condition; and
      5) generating a first access method from the multi-column range condition; and
    B) a set of computer instructions stored in the Computer Software Storage Medium for translating the first pattern into a first set of concatenated keys that represents the first multiple column range limit, wherein:
      the first set of concatenated keys can be utilized to limit a search of the database.

17. The database management software system in claim 16 which further comprises:
  C) a set of computer instructions stored in the Computer Software Storage Medium for detecting a second pattern in SQL that occurs when a second plurality of search conditions are present that represent a second set of values that provide a second multiple column range limit across multiple columns of the database table; and
  D) a set of computer instructions stored in the Computer Software Storage Medium for translating the second pattern into a second set of concatenated keys that represents the second multiple column range limit, wherein:
    the second set of concatenated keys can be utilized to limit the search of the database.

18. The database management software system in claim 17 wherein:
  the first multiple column range limit is a lower limit on the search of the database; and
  the second multiple column range limit is an upper limit on the search of the database.

* * * * *